United States Patent
Moje et al.

(10) Patent No.: US 9,771,170 B2
(45) Date of Patent: Sep. 26, 2017

(54) AIRCRAFT SYSTEM COMPONENT CARRIER MODULE AND SYSTEM

(71) Applicant: AIRBUS OPERATIONS GMBH, Hamburg (DE)

(72) Inventors: Sabrina Moje, Hamburg (DE); Dirk Humfeldt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 651 days.

(21) Appl. No.: 13/923,669

(22) Filed: Jun. 21, 2013

(65) Prior Publication Data
US 2013/0284868 A1  Oct. 31, 2013

Related U.S. Application Data

(63) Continuation of application No. PCT/EP2011/006444, filed on Dec. 20, 2011.
(Continued)

(30) Foreign Application Priority Data

Dec. 23, 2010 (DE) .......................... 10 2010 055 962
Dec. 23, 2010 (DE) .......................... 10 2010 055 995

(51) Int. Cl.
*B64F 5/00* (2017.01)
*B64C 1/06* (2006.01)
(Continued)

(52) U.S. Cl.
CPC ............ *B64F 5/0009* (2013.01); *B25B 5/006* (2013.01); *B64C 1/06* (2013.01); *B64C 1/068* (2013.01);
(Continued)

(58) Field of Classification Search
CPC ...... B64F 5/0009; B64F 5/0036; B25B 5/006; B64C 1/06; B64C 1/068; B64D 11/00;
(Continued)

(56) References Cited

U.S. PATENT DOCUMENTS 5,839,694 A * 11/1998 Bargull ................ B64D 11/003
244/118.1
6,318,671 B1    11/2001 Schumacher
(Continued)

FOREIGN PATENT DOCUMENTS

DE     198 39 701          3/2000
DE     102006016509 A1 * 10/2007  ........... B64D 11/003
(Continued)

OTHER PUBLICATIONS

International Search Report dated Jun. 29, 2012.

*Primary Examiner* — Sarang Afzali
(74) *Attorney, Agent, or Firm* — Dickinson Wright

(57) ABSTRACT

An aircraft system component carrier module includes a carrier element which is arc-shaped at least in sections and is configured, when the module is mounted in an aircraft, to extend at least in some sections substantially in the direction of the ribs of an aircraft structure over at least a section of a crown area of an aircraft cabin. The module includes a transverse carrier element which is configured, when the module is mounted in an aircraft, to extend in the crown area of an aircraft cabin substantially perpendicularly to a longitudinal axis of the cabin. The module further includes a structure holder for fastening the module to the aircraft structure, an aircraft system component holder for fastening at least one of the aircraft system components to the module and an attaching device, connected to the transverse carrier element, for attaching an aircraft luggage compartment to the module.

9 Claims, 10 Drawing Sheets

Related U.S. Application Data

(60) Provisional application No. 61/426,579, filed on Dec. 23, 2010, provisional application No. 61/426,596, filed on Dec. 23, 2010.

(51) Int. Cl.
*B64D 11/00* (2006.01)
*B25B 5/00* (2006.01)
*B64F 5/10* (2017.01)

(52) U.S. Cl.
CPC ............ *B64D 11/00* (2013.01); *B64D 11/003* (2013.01); *B64F 5/10* (2017.01); *Y10T 29/49764* (2015.01); *Y10T 29/49826* (2015.01)

(58) Field of Classification Search
CPC .......... B64D 11/003; B64D 2011/0046; Y10T 29/49826; Y10T 29/49764
See application file for complete search history.

(56) References Cited

U.S. PATENT DOCUMENTS

| | | | |
|---|---|---|---|
| 6,536,710 B1 | 3/2003 | Bobzien | |
| 8,317,132 B2 * | 11/2012 | Pein | B64D 11/003 244/118.5 |
| 8,776,353 B2 * | 7/2014 | Herzog | B64C 1/066 244/129.5 |
| 8,905,349 B2 * | 12/2014 | Gross | B64C 1/064 244/119 |
| 2005/0236523 A1 | 10/2005 | Schwartz | |
| 2009/0230244 A1 * | 9/2009 | Kofinger | B64C 1/066 244/118.5 |
| 2010/0301167 A1 | 12/2010 | Humfeldt | |
| 2010/0301537 A1 | 12/2010 | Humfeldt | |
| 2011/0024565 A1 | 2/2011 | Koefinger | |
| 2012/0131779 A1 | 5/2012 | Umlauft | |
| 2012/0137487 A1 | 6/2012 | Umlauft | |
| 2012/0145828 A1 | 6/2012 | Grosse-Plankermann | |
| 2013/0200213 A1 | 8/2013 | Umlauft | |

FOREIGN PATENT DOCUMENTS

| | | | |
|---|---|---|---|
| DE | 102007019821 A1 * | 11/2008 | .............. B64C 1/064 |
| DE | 10 2007 050 422 | 4/2009 | |
| DE | 102008020789 A1 * | 11/2009 | .............. B64C 1/066 |
| DE | 10 2009 023 391 | 12/2010 | |
| DE | 10 2009 023 393 | 12/2010 | |
| DE | 10 2009 023 400 | 12/2010 | |
| DE | 10 2009 023 401 | 12/2010 | |
| DE | 10 2010 026 683 | 1/2012 | |
| EP | 1 591 357 | 11/2005 | |
| WO | 2008/022688 | 2/2008 | |
| WO | 2010/145915 | 12/2010 | |

* cited by examiner

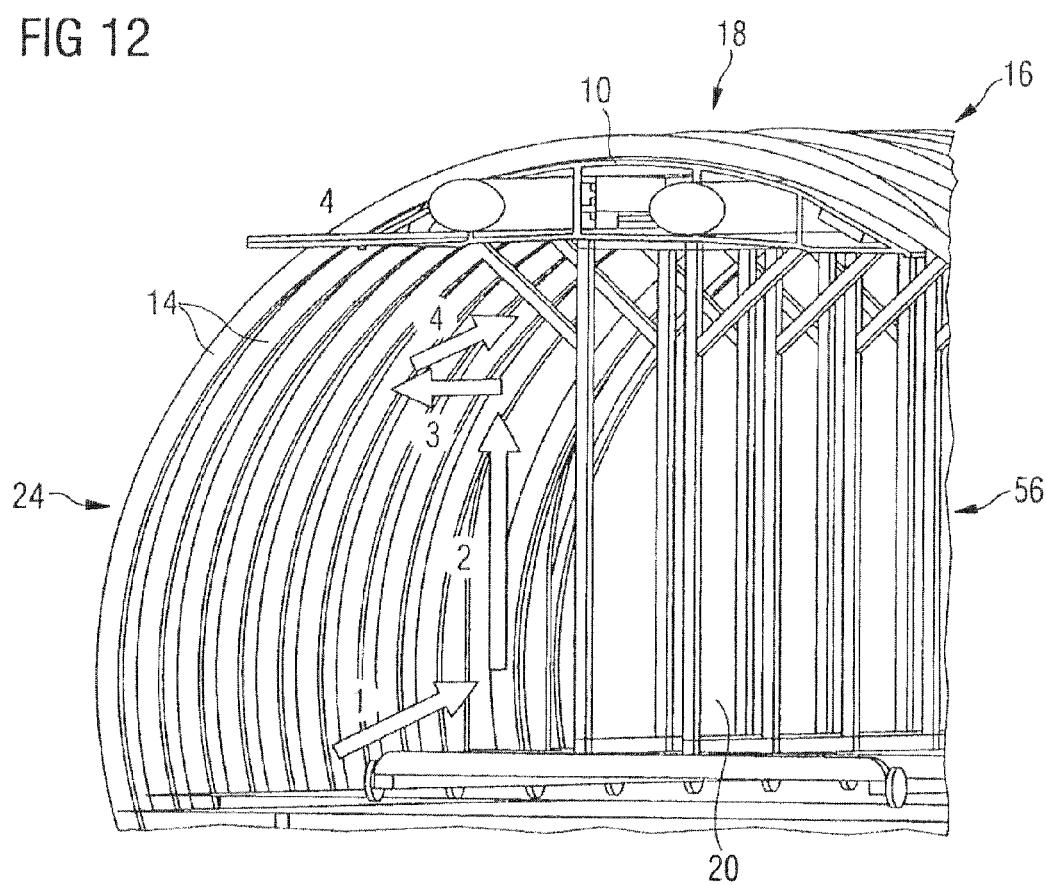

AIRCRAFT SYSTEM COMPONENT CARRIER MODULE AND SYSTEM

CROSS REFERENCE TO RELATED APPLICATIONS

This application is a bypass continuation of PCT/EP2011/006444 filed Dec. 20, 2011 which is entitled to and claims the benefit of German Application No. DE 10 2010 055 962.8 filed Dec. 23, 2010, German Application No. DE 10 2010 055 995.4 filed Dec. 23, 2010, U.S. Provisional Application No. 61/426,579, filed Dec. 23, 2010 and U.S. Provisional Application No. 61/426,596, filed Dec. 23, 2010, the disclosures of each of which, including the specification, claims, drawings and abstract, are incorporated herein by reference in their entirety.

FIELD

The invention relates to an aircraft system component carrier module and to an aircraft system component carrier system comprising a plurality of such aircraft system component carrier modules. The invention further relates to a method for mounting such an aircraft system component carrier system in an aircraft.

BACKGROUND

On the mounting of system components in the crown area (ceiling area) of an aircraft, it is customary at present to connect components, such as, for example, electrical or electronic components, components of the aircraft air-conditioning system or other aircraft systems, ceiling covering panels, lighting elements and the like, individually to the aircraft structure. Since each component has to be separately positioned and fastened to the aircraft structure, the mounting of these components is very time-consuming. Similarly, for example, pipelines serving as air-conducting lines of the aircraft air-conditioning system or for water supply in an aircraft cabin, and also electric lines, are at present also fastened individually to the aircraft structure. This is time-consuming and leads to many interfaces between the individual components and the primary structure of the aircraft, which necessitate costly structure-borne noise decoupling of the individual components. Moreover, many different holders are stocked for the different individual components, making not only the mounting but also the storage more difficult. After mounting, the proper functioning of all the components and lines must be checked in a final inspection. In particular, all the pipelines have to undergo a tightness check, while in the case of the electric lines it is necessary to check all the interfaces. These tests are likewise relatively onerous, since the lines and interfaces to be checked are often accessible only with difficulty in the mounted state.

For this reason, efforts are being made to preassemble and test interior components provided for mounting in an aircraft, for example in an aircraft cabin, as extensively as possible outside the aircraft. For example, modules which may comprise at least one overhead luggage compartment, at least one side covering panel and other components, such as, for example, electric lines, air-conducting lines of an aircraft air-conditioning system or pipelines serving for water supply in the aircraft cabin, lighting elements, personal service units and personal service channels, are to be preassembled and tested outside the aircraft, optionally with the aid of a suitable assembly frame described in DE 10 2009 023 391. Subsequently, the modules are to be transported by means of a transporting apparatus described in DE 10 2009 023 393 into a final mounting position in an aircraft fuselage element. Finally, in the aircraft fuselage element, the modules are to be connected to the aircraft structure in the simplest and most time-saving manner possible. For this purpose, holder systems described in DE 10 2009 023 400 and DE 10 2009 023 401 can be employed. Finally, DE 10 2010 026 683 describes an interior component carrier system for mounting an aircraft interior component module, comprising a plurality of interior components, on an aircraft structure.

SUMMARY

The invention is directed at the object of providing an aircraft system component carrier module which makes it possible to preassemble a plurality of aircraft system components, provided for mounting in the crown area and side wall areas of an aircraft, in a simple, secure and time-saving manner to form an aircraft system component module and subsequently fasten the latter to an aircraft structure in only one mounting step. The invention is further directed at the object of specifying an aircraft system component carrier system comprising a plurality of such aircraft system component carrier modules. A further object of the invention is to specify a time- and thus cost-saving method for mounting such an aircraft system component carrier system in an aircraft.

This object is achieved by an aircraft system component carrier module having features of attached claims, an aircraft system component carrier system having features of attached claims and a method for mounting an aircraft system component carrier system in an aircraft having features of attached claims.

An aircraft system component carrier module according to the invention comprises a carrier element which is arc-shaped at least in sections and is configured, when the aircraft system component carrier module is mounted in an aircraft, to extend at least in sections substantially in the direction of the ribs of an aircraft structure over at least a section of a crown area of an aircraft cabin. Preferably, the shape, that is to say the curvature, of the arc-shaped carrier element is adapted to the shape, that is to say the curvature, of the ribs of the aircraft structure. The arc-shaped carrier element can be designed in the form of a round arch. Alternatively to this, however, a configuration of the carrier element with a plurality of sections which adjoin one another, are substantially straight, but inclined relative to one another is also conceivable, so that the whole of the sections constituting the carrier element in turn describes substantially an arc shape. The arc-shaped carrier element can be a carrier element which is shaped such that, when the aircraft system component carrier module is mounted in an aircraft, it extends over the entire crown area of the aircraft cabin. Alternatively to this, however, the aircraft system component carrier module according to the invention can also comprise a plurality of carrier elements which each extend over a section of the crown area.

The aircraft system component carrier module further comprises a transverse carrier element which is configured, when the aircraft system component carrier module is mounted in an aircraft, to extend substantially perpendicularly to a longitudinal axis of the aircraft cabin. The transverse carrier element is preferably connected to at least one end of the carrier element. When the aircraft system component carrier module is mounted in an aircraft, the transverse carrier element can extend over its entire length substantially parallel to a transverse axis of the aircraft cabin. Alternatively to this, however, the transverse carrier element can also be designed such that, when the aircraft system component carrier module is mounted in an aircraft, although it extends substantially perpendicularly to the longitudinal axis of the aircraft cabin, it is oriented at least in some sections obliquely with respect to the transverse axis of the aircraft cabin. Preferably, the transverse carrier element is connected to both ends of the carrier element.

The aircraft system component carrier module according to the invention further comprises a structure holder for fastening the aircraft system component carrier module to the aircraft structure. The structure holder can, for example, be configured to fasten the aircraft system component carrier module to a rib of the aircraft structure. The aircraft system component carrier module further comprises an aircraft system component holder for fastening at least one aircraft system component to the aircraft system component carrier module. By attachment to the aircraft structure, the aircraft system component carrier module is integrated into the aircraft structure, i.e. it assumes a bearing function of the aircraft structure. The aircraft system component holder can be a holder for fastening any desired aircraft system component to the aircraft system component carrier module. For example, the aircraft system component holder can be configured to fasten a fluid line or a plurality of fluid lines, an electric line or a plurality of electric lines, an electronic component or a lighting element to the aircraft system component carrier module. All that is essential is for the aircraft system component which is to be fastened to the aircraft system component carrier module by means of the aircraft system component holder to be an aircraft system component which is provided for mounting in a crown area of the aircraft cabin.

The aircraft system component carrier module according to the invention further comprises an attaching device, connected to the transverse carrier element, for attaching an aircraft luggage compartment to the aircraft system component carrier module. The attaching device can be used to attach merely an aircraft luggage compartment to the aircraft system component carrier module. Alternatively to this, however, it is also conceivable to use the attaching device of the aircraft system component carrier module to connect not only an aircraft luggage compartment, but a module comprising besides the aircraft luggage compartment also further aircraft interior components, to the aircraft system component carrier module. The module to be connected to the aircraft system component carrier module according to the invention can comprise, besides an aircraft luggage compartment, for example a side covering panel, a dado panel, a personal service unit, a personal service channel, etc.

By means of the aircraft system component carrier module according to the invention, an aircraft system component to be mounted in the crown area of an aircraft cabin and an aircraft luggage compartment can be conveniently connected to the aircraft system component carrier module outside the aircraft. Subsequently, the aircraft system component carrier module with the aircraft system component attached thereto can be simply and conveniently fastened to the aircraft structure by means of the structure holder. A standardised holder can be used as the structure holder. The provision of a holder specifically adapted to the aircraft structure component to be mounted can, in contrast, be dispensed with. The aircraft system component carrier module according to the invention thus simplifies the mounting of an aircraft system component to be installed in the crown area of an aircraft cabin and of a luggage compartment in the aircraft cabin. An assembly frame, described in more detail later, can be employed for assembly of the aircraft system component carrier module.

The aircraft system component carrier module according to the invention can be equipped with a plurality of aircraft system component holders for fastening a plurality of aircraft system components to the aircraft system component carrier module. Furthermore, an aircraft system component holder fitted on the aircraft system component carrier module can be configured to attach a plurality of aircraft system components to the aircraft system component carrier module. The individual aircraft system components can then be conveniently fitted on the aircraft system component carrier module outside the aircraft. Subsequently, the module with the aircraft system components fastened thereto can be attached to the aircraft structure in one step by means of the structure holder of the aircraft system component carrier module. Preferably, the aircraft system component carrier module or an aircraft system component provided for mounting on the module consists at least partially of metal. The module and/or the aircraft system component can then perform a protective conductor function and is/are particularly well suited for use in an aircraft with a structure consisting of a fibre-reinforced composite material.

The aircraft system component carrier module according to the invention can further comprise a connecting element which is connected to the carrier element and/or the transverse carrier element. Preferably, the connecting element connects the carrier element to the transverse carrier element. For example, the connecting element, when the aircraft system component carrier module is mounted in an aircraft, can extend substantially perpendicularly to the longitudinal axis and substantially perpendicularly to the transverse axis of the aircraft cabin. The structure holder for fastening the aircraft system component carrier module to the aircraft structure can be fastened to the carrier element, the transverse carrier element or a connecting element of the aircraft system component carrier module. Similarly, an aircraft system component holder for fastening at least one aircraft system component to the aircraft system component carrier module can be fitted on the carrier module, the transverse carrier module or a connecting element of the aircraft system component carrier module.

The transverse carrier element can comprise a first section connected to the carrier element and a second section connected detachably to the first section and/or to a connecting element. By configuring the transverse carrier element with a second section connected detachably to a first section and/or to a connecting element, the access to aircraft system components connected to the aircraft system component carrier module can be simplified. For example, if maintenance or replacement of an aircraft system component connected to the aircraft system component carrier module is required, the second section of the transverse carrier element can be detached from the first section of the transverse carrier element and/or the connecting element and the access to the aircraft system component to be replaced or maintained thereby facilitated.

The second section of the transverse carrier element can be connected, for example, pivotably to the first section of the transverse carrier element, to a third section of the transverse carrier element and/or to a connecting element of the aircraft system component carrier module. The pivotable connection of the second section of the transverse carrier element to the first section of the transverse carrier element, to a third section of the transverse carrier element and/or to a connecting element can be realised, for example, by means of a hinge. The second section of the transverse carrier element can then be conveniently pivoted relative to the first section of the transverse carrier element if an aircraft system component connected to the aircraft system component carrier module is to be made more easily accessible.

The carrier element, the transverse carrier element, the connecting element and/or the guide channel delimiting element can each be designed in the form of webs or in the form of tubular elements.

The attaching device can comprise an attaching rail fitted on the transverse carrier element of the aircraft system component carrier module. Preferably, the attaching rail has an L-shaped cross-section. Preferably, the attaching rail is provided for cooperation with a hook element fitted on an aircraft luggage compartment. The aircraft luggage compartment can then be simply and conveniently connected to the aircraft system component carrier module by hooking the hook element, fitted on the aircraft luggage compartment, in the attaching rail.

Alternatively or additionally to this, the attaching device can comprise a holder fitted on the transverse carrier element and having a substantially U-shaped cross-section. Preferably, the holder is provided for cooperation with a pin element fitted on an aircraft luggage compartment. The aircraft luggage compartment can then be simply and conveniently connected to the aircraft system component carrier module by introducing the pin element, fitted on the aircraft luggage compartment, into the holder.

Preferably, the holder of the attaching device is provided with a locking mechanism for locking a pin element, fitted on an aircraft luggage compartment, in its position in the holder. The locking mechanism can be designed in the form of a catch mechanism which locks a pin element, fitted on an aircraft luggage compartment, automatically in its position in the holder when the pin element has reached a defined end position in the holder.

In a preferred embodiment of the aircraft system component carrier module according to the invention, the attaching device has a first holder fitted on the transverse carrier element and having a substantially U-shaped cross-section and a second holder fitted on the transverse carrier element and likewise having a substantially U-shaped cross-section. The first and the second holder can each be provided for cooperation with a pin element fitted on an aircraft luggage compartment. In particular, the first holder can comprise an elongated leg which is configured to support temporarily, on the attachment of the aircraft luggage compartment to the aircraft system component carrier module, a pin element fitted on the aircraft luggage compartment and provided for cooperation with the first holder. Such a configuration of the attaching device facilitates the attachment of an aircraft luggage compartment to the aircraft system component carrier module according to the invention.

The structure holder of the aircraft system component carrier module according to the invention can comprise a projection which is connected to the carrier element and/or the transverse carrier element and which, when the aircraft system component carrier module is mounted in an aircraft, extends substantially perpendicularly to the longitudinal axis and substantially parallel to a transverse axis of the aircraft cabin and is provided for reception in a receiving device which can be fastened to the aircraft structure. A structure holder thus configured enables simple and convenient mounting of the aircraft system component carrier module on the aircraft structure.

An aircraft system component carrier system according to the invention comprises a plurality of aircraft system component carrier modules which can have the features described above. When the aircraft system component carrier system is mounted in an aircraft, the aircraft system component carrier modules are arranged one behind the other in the direction of a longitudinal axis of the aircraft cabin.

The aircraft system component carrier system according to the invention can comprise an aircraft system component which is designed in the form of a pipeline or a fastening rail and is fastened to a plurality of the aircraft system component carrier modules by means of an aircraft system component holder of the aircraft system component carrier modules. In other words, the aircraft system component spans a plurality of aircraft system component carrier modules which, when the aircraft system component carrier system is mounted in an aircraft, are arranged one behind the other in the direction of the longitudinal axis of the aircraft cabin. The aircraft system component, in the state of the aircraft system component carrier system when mounted in an aircraft, can extend parallel to the longitudinal axis of the aircraft cabin.

Preferably, the fastening rail has an Q-shaped cross-section. Furthermore, standardised adapter plates for attaching aircraft system components to be mounted in the crown area of an aircraft cabin can be fitted on a fastening rail.

The aircraft system component carrier system according to the invention can further have a receiving device, which is fastenable to the aircraft structure, for cooperation with the structure holders provided on the aircraft system component carrier modules. Preferably, the receiving device comprises a first web and a second web extending substantially parallel to the first web. The distance of the webs of the receiving device from one another is preferably chosen such that the projections provided on the structure holders of the aircraft system component carrier modules can be positioned between the webs of the receiving device. For the final fastening of the projections provided on the structure holders of the aircraft system component carrier modules to the webs, suitable fastening means, such as for example screws, rivets or the like, can be employed.

Preferably, the first web of the receiving device is a continuous web. The second web of the receiving device, in contrast, is preferably designed in the form of an interrupted web. The distance between web sections of the second web which are separated from one another is preferably adapted to the distance between mutually adjacent aircraft system component carrier modules of the aircraft system component carrier system. This ensures that the structure holders of each aircraft system component carrier module can be brought into engagement with the webs of the receiving device.

In a method for mounting an aircraft system component carrier system in an aircraft according to the invention, firstly a plurality of aircraft system component carrier modules described above are fastened to an assembly frame in such a way that the aircraft system component carrier modules are arranged one behind the other in the direction of a longitudinal axis of the assembly frame. The assembly frame is preferably situated outside an aircraft, in order to enable convenient assembly of the aircraft system component carrier modules on the assembly frame. In a subsequent step, at least one aircraft system component is mounted on the aircraft system component carrier modules by means of the aircraft system component holder provided on the aircraft system component carrier modules. The aircraft system component to be mounted can be an aircraft system component which is provided for connection merely to one aircraft system component carrier module of the aircraft system component carrier system. Alternatively to this, however, the aircraft system component can also be a component which is fastened to a plurality of aircraft system component carrier modules of the aircraft system component carrier system. An aircraft system component to be fastened to a plurality of aircraft system component carrier modules can, for example, be a pipeline or an electric line which, in the state of the aircraft system component carrier system when mounted in an aircraft, extends in a crown area of the aircraft cabin substantially parallel to the longitudinal axis of the aircraft cabin.

Furthermore, in the method for mounting an aircraft system component carrier system in an aircraft according to the invention, an aircraft luggage compartment is attached to at least one aircraft system component carrier module by means of the attaching device provided on the aircraft system component carrier module. Depending on the shape and size of the aircraft luggage compartment, the aircraft luggage compartment can be connected to two or more aircraft system component carrier modules. Further components of the aircraft interior fittings can be attached to the aircraft system component carrier module via the aircraft luggage compartment. For example, a side covering panel, a dado panel, a personal service unit, a personal service channel or the like can be connected to the aircraft system component carrier module via the aircraft luggage compartment.

Finally, the aircraft system component carrier modules, with the aircraft system component preassembled on the aircraft system component carrier modules, are mounted in an aircraft fuselage element by means of the structure holder provided on the aircraft system component carrier modules, in such a way that the aircraft system component carrier modules are arranged one behind the other in a crown area of an aircraft cabin in the direction of a longitudinal axis of an aircraft cabin. The aircraft fuselage element can be an aircraft fuselage shell segment or a complete aircraft fuselage shell. All that is essential is that the aircraft fuselage element has an access which is sufficiently large to enable transport of an aircraft system component carrier system preassembled outside the aircraft fuselage element into the aircraft fuselage element.

The aircraft luggage compartment can be attached to the aircraft system component carrier module by hooking a hook element, fitted on the aircraft luggage compartment, into an attaching rail having an L-shaped cross-section, which rail is fitted on the transverse carrier element of the aircraft system component carrier module.

Alternatively or additionally to this, the aircraft luggage compartment can be attached to the aircraft system component carrier module by inserting a pin element, fitted on the aircraft luggage compartment, into a holder, fitted on the transverse carrier element of the aircraft system component carrier module and having a substantially U-shaped cross-section.

Preferably, the pin element fitted on the aircraft luggage compartment is locked in its position in the holder by means of a locking mechanism of the holder.

In a preferred embodiment of the method according to the invention, an aircraft luggage compartment is attached to the aircraft system component carrier module in a first step by setting down a pin element, fitted on the aircraft luggage compartment, on an elongated leg of a first holder, fitted on the transverse carrier element of the aircraft system component carrier module and having a substantially U-shaped cross-section. Subsequently, the aircraft luggage compartment is moved in such a way that the pin element set down on the elongated leg of the first holder is received in the first holder and a further pin element, fitted on the aircraft luggage compartment, is received in a second holder, fitted on the transverse carrier element of the aircraft system component carrier module and having a substantially U-shaped cross-section.

Preferably, before the final mounting of the aircraft system component carrier modules, with the aircraft system component preassembled on the aircraft system component carrier modules, in an aircraft fuselage element, the operability of the aircraft system component is tested. In other words, the functionality testing of the aircraft system component preferably takes place already outside the aircraft. Consequently, after the final mounting of the aircraft system component carrier modules in the aircraft fuselage element, all that is required is an interface check.

BRIEF DESCRIPTION OF DRAWINGS

A preferred embodiment of the invention will now be explained in more detail with the aid of the appended, schematic drawings, of which FIG. 12 shows the fastening of an aircraft system component carrier system in an aircraft fuselage element.

DETAILED DESCRIPTION

Figure 1:
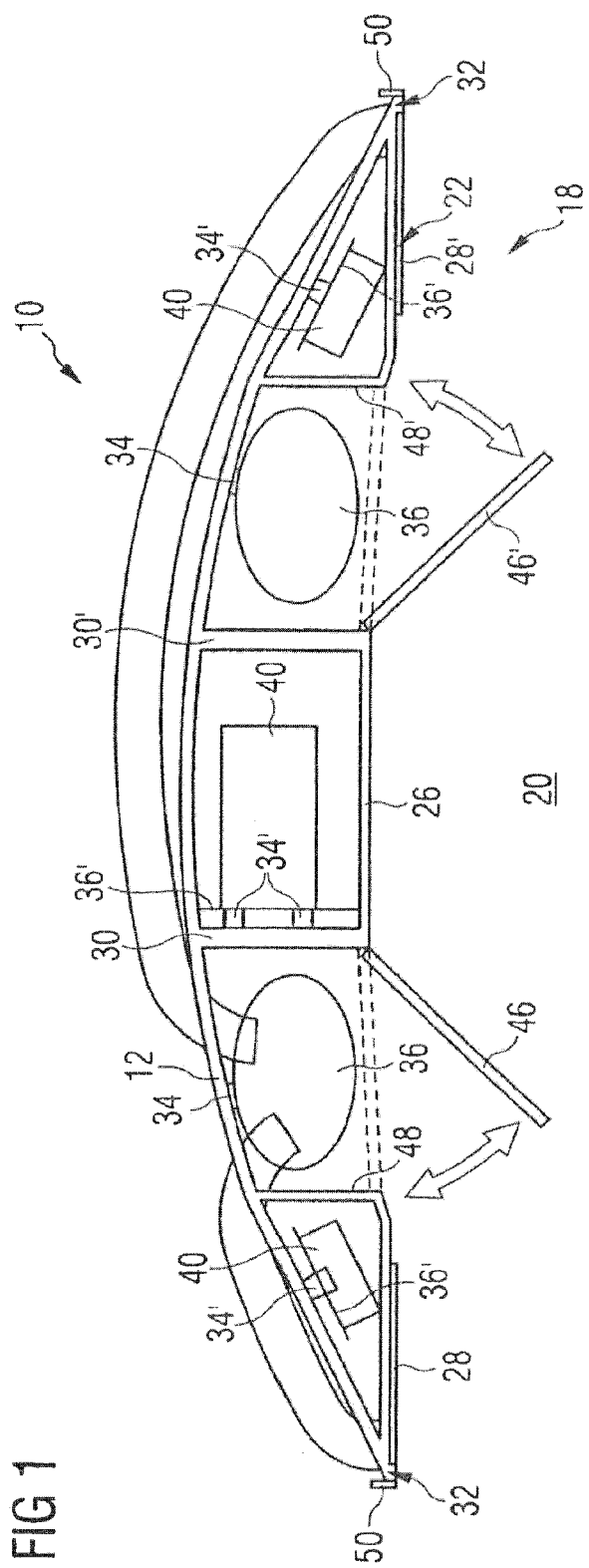
FIG. 1 shows an aircraft system component carrier module.

An aircraft system component carrier module 10 illustrated in FIG. 1 comprises an arc-shaped carrier element 12 which, when the aircraft system component carrier module 10 is mounted in an aircraft, extends substantially parallel to a rib 14 of an aircraft structure 16 (see FIG. 12) over a section of a crown area 18 of an aircraft cabin 20. A first end of a transverse carrier element 22 is connected to a first end of the first carrier element 12 facing a side wall 24 of the aircraft cabin 20. A second end of the transverse carrier element 22, in contrast, is connected to a second end of the carrier element 12 facing a side wall of the aircraft cabin 20 opposite the side wall 24.

The transverse carrier element 22 comprises a central section 26 which, when the aircraft system component carrier module 10 is mounted in an aircraft, extends substantially perpendicularly to a longitudinal axis of the aircraft cabin 20 and substantially parallel to a transverse axis of the aircraft cabin 20.

The carrier element 12 is connected to the central section 26 of the transverse carrier element 22 via a first and a second connecting element 30, 30'. In the embodiment of an aircraft system component carrier module shown in FIG. 1, the connecting elements 30, 30' extend substantially perpendicularly to the longitudinal axis and perpendicularly to the transverse axis of the aircraft cabin 20. However, the connecting elements 30, 30' can, of course, have a different orientation, in particular relative to the transverse axis of the aircraft cabin 20. The aircraft system component carrier module 10 further comprises, besides the connecting elements 30, 30', two further connecting elements 48, 48' extending substantially parallel to the connecting elements 30, 30'.

The aircraft system component carrier module 10 illustrated in FIG. 1 is fixed to the aircraft structure 16 via structure holders 32. As can best be seen in FIGS. 10 and 11, the structure holders 32 each comprise a projection 50 which, when the aircraft system component carrier module 10 is mounted in an aircraft, extends substantially perpendicularly to the longitudinal axis and substantially parallel to the transverse axis of the aircraft cabin 20. The projection 50 of the structure holder 32 is provided for reception in a receiving device 52 which can be fastened to the aircraft structure 16, and which will be explained in more detail below. The structure holders 32 are standardised holders which have to be adapted merely to the configuration of the aircraft system component carrier module 10, but not individualised for the fastening, to the aircraft structure 16, of an aircraft system component to be mounted in the crown area 18 of the aircraft cabin 20.

Rather, different aircraft system components to be arranged in the crown area 18 of the aircraft cabin 20 are mounted in their final mounting position with the aid of the aircraft system component carrier module 10. For this purpose, the aircraft system component carrier module 10 comprises two first aircraft system component holders 34 which serve to fasten two first aircraft system components 36, designed in the form of a pipeline, to the aircraft system component carrier module 10. Three second aircraft system component holders 34' each serve to fasten a second aircraft system component 36', designed in the form of a fastening rail, to the aircraft system component carrier module 10. The fastening rail constituting the second aircraft system component 36' has an Ω-shaped cross-section and carries standardised adapter plates, to which further aircraft system components 40, designed in the form of electronics boxes for example, can be fastened. When the aircraft system component carrier module 10 is mounted in an aircraft, the second aircraft system components 36' each designed in the form of a fastening rail, just as the first aircraft system components 36 designed in the form of pipelines, extend substantially parallel to the longitudinal axis of the aircraft cabin 20.

The central section 26 of the transverse carrier element 22 is connected to end sections 28, 28' of the transverse carrier element 22 via connecting sections 46, 46' flanking the central section 26 on both sides. The connecting sections 46, 46' are each pivotably linked to the central section 26. As a result, the connecting sections 46, 46' can be pivoted from a closed position, illustrated by broken lines in FIG. 1, into an open position, illustrated by continuous lines in FIG. 1. In their open position, the connecting sections 46, 46' allow access to the first aircraft system components 36 designed in the form of pipelines. As a result, the replacement and maintenance of these components 36, in particular, when the aircraft system component carrier module 10 is mounted in an aircraft, is considerably simplified.

Figure 2:
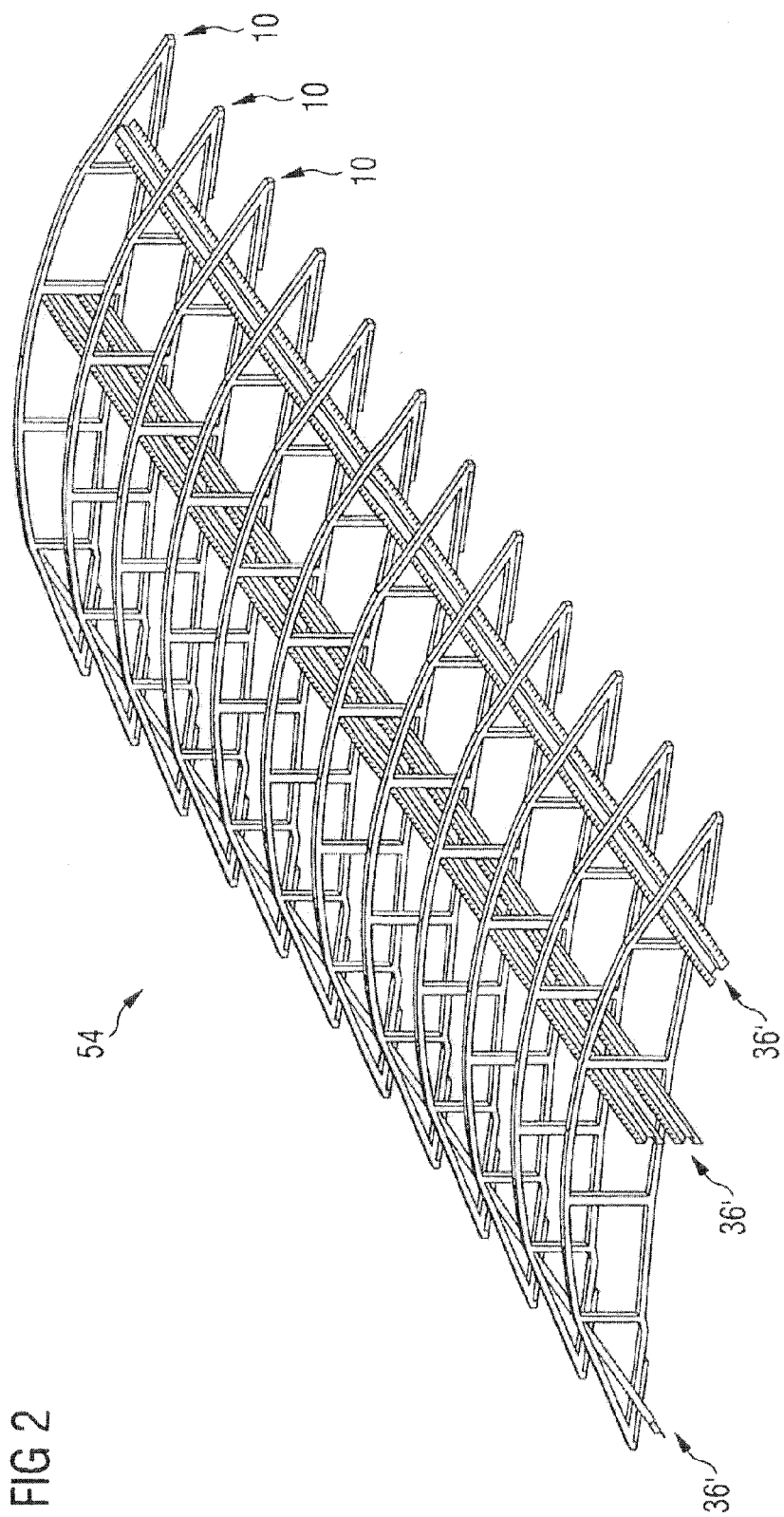
FIG. 2 shows an aircraft system component carrier system comprising a plurality of aircraft system component carrier modules.

As can be seen in FIG. 2, a plurality of aircraft system component carrier modules can be used to form an aircraft system component carrier system 54. When the aircraft system component carrier system 54 is mounted in an aircraft, the individual aircraft system component carrier modules 10 are arranged one behind the other in the direction of the longitudinal axis of the aircraft cabin 20. The distance between two mutually adjacent aircraft system component carrier modules 10 of the aircraft system component carrier system 54 corresponds to the distance between two mutually adjacent ribs 14 of the aircraft structure 16. As a result, each aircraft system component carrier module 10 of the aircraft system component carrier system 54 can be fastened to a rib 14 of the aircraft structure 16.

An aircraft system component carrier system 54 comprising a plurality of aircraft system component carrier modules 10 arranged one behind the other in the direction of the longitudinal axis of the aircraft cabin 20 is particularly well suited for mounting aircraft system components in the crown area 18 of the aircraft cabin 20 which extend over a relatively long distance along the longitudinal axis of the aircraft cabin 20, that is to say over a length extending over a plurality of rib bays along the longitudinal axis of the aircraft cabin 20. The aircraft system component carrier system 54 is therefore particularly well suited for mounting the first aircraft system components 36 designed in the form of pipelines and the second aircraft system components 36' designed in the form of Ω-shaped fastening rails in the crown area 18 of the aircraft cabin 20, since these components 36, 36' can be fastened to a plurality of aircraft system component carrier modules 10 via corresponding aircraft system component holders 34, 34' of a plurality of aircraft system component carrier modules 10 arranged one behind the other.

Figure 3:
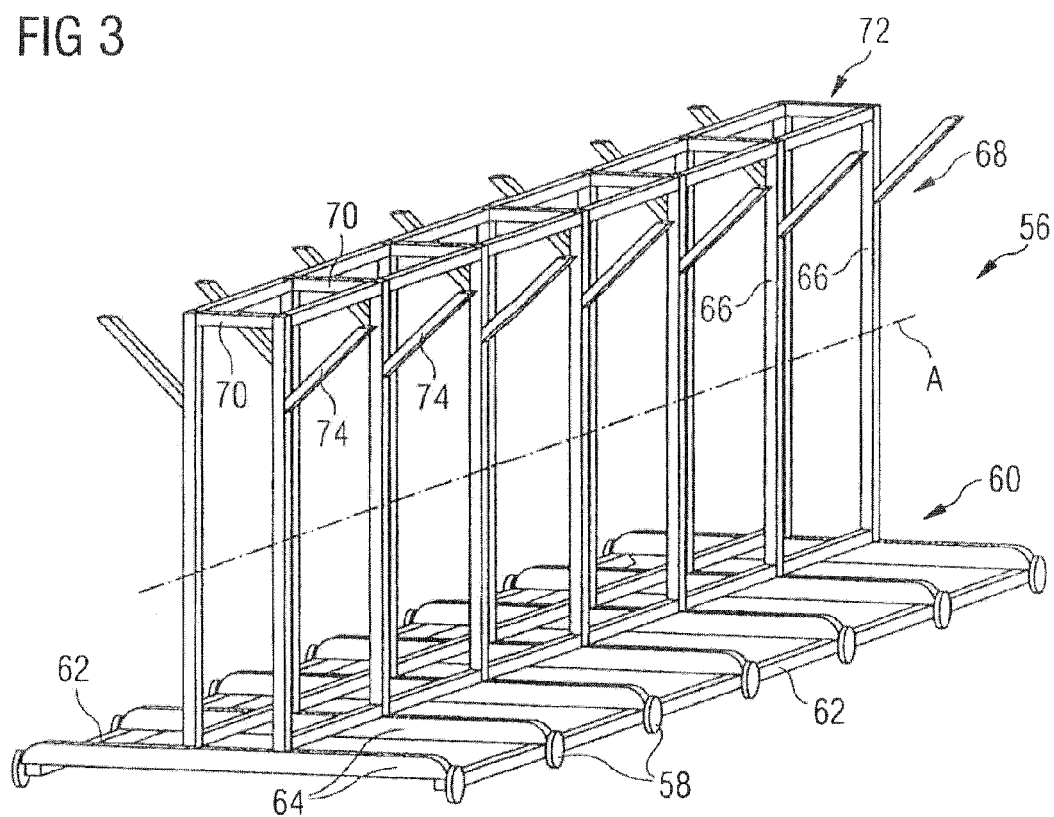
FIG. 3 shows an assembly frame for assembling an aircraft system component carrier system according to FIG. 2.

FIG. 3 illustrates an assembly frame 56, with the aid of which the aircraft system component carrier system 54 comprising a plurality of aircraft system component carrier modules 10 can be conveniently preassembled outside an aircraft or an aircraft fuselage element. The assembly frame 56 comprises a base 60 which is provided with wheels 58 and which is defined by two longitudinal struts 62 arranged parallel to one another and carrying the wheels 58 and by transverse struts 64 connecting the longitudinal struts 62 to one another. A supporting structure 68 comprising a plurality of vertical struts is connected to the base 60, the vertical struts 66 being so arranged and connected to one another by corresponding connecting struts 70 that a supporting area 72 is formed which, on assembly of the aircraft system component carrier system 54 carries the individual aircraft system component carrier modules 10. In particular, in the supporting area 72, there is assigned to each aircraft system component carrier module 10 a corresponding connecting strut 70 which extends substantially parallel to the transverse struts 64 of the base 60 and on which the transverse carrier element 22 of the aircraft system component carrier module 10 can be laid. Furthermore, two supporting struts 74, extending obliquely outwards from the vertical struts 66, each serve to support the transverse carrier element 22 of an aircraft system component carrier module 10 (see FIGS. 4 and 5).

Figure 4:
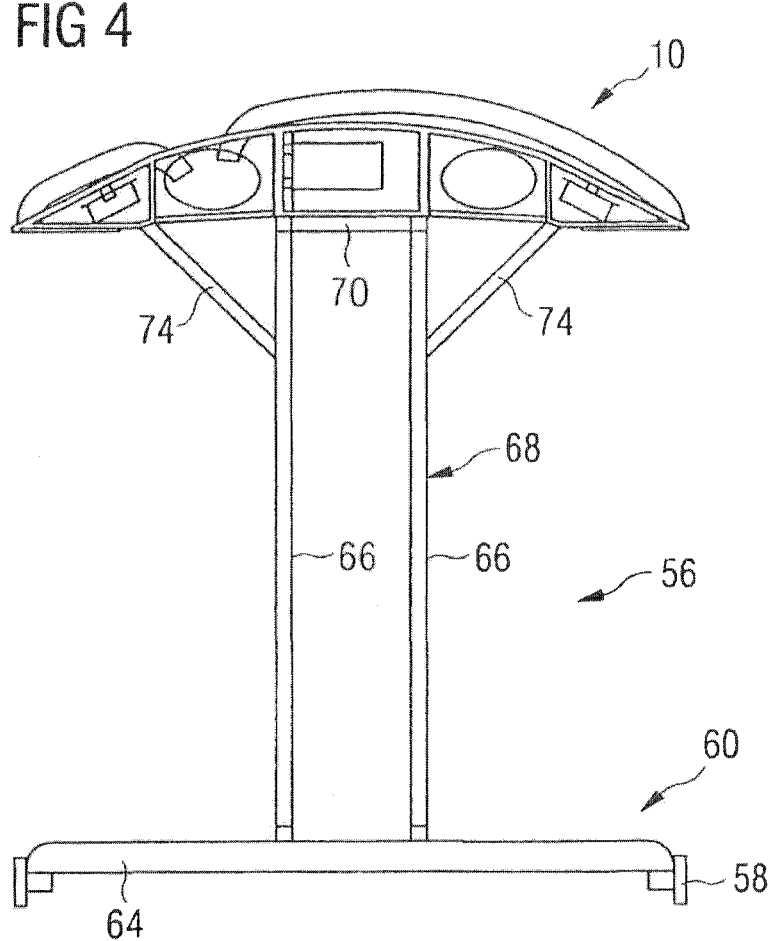
FIG. 4 shows the assembly frame according to FIG. 3 with an aircraft system component carrier system fastened thereon.
Figure 5:
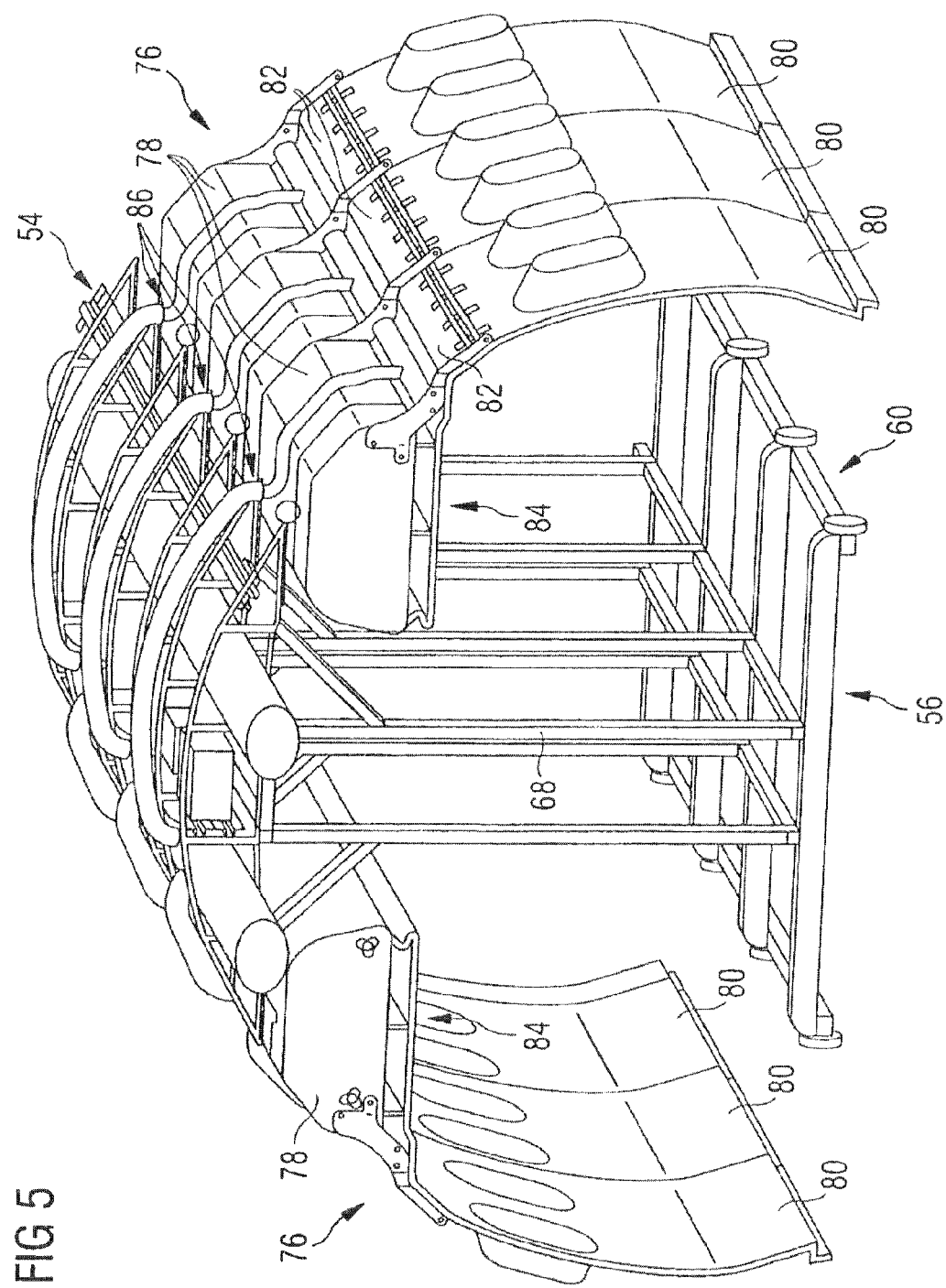
FIG. 5 shows the assembly frame according to FIG. 3 with an aircraft system component carrier system fastened thereon and side area modules fastened thereon.

The assembly frame 56 can be used merely for assembling the aircraft system component carrier system 54, as illustrated in FIG. 4. If desired, however, it is also possible with the aid of the assembly frame 56 to connect the individual aircraft system component carrier modules 10 of the aircraft system component carrier system 54 to side area modules 76 provided for mounting in a side wall area of the aircraft cabin 20 (see FIG. 5). The side area modules 76 can comprise a luggage compartment 78 or a plurality of luggage compartments 78 arranged one beside the other, a side covering panel 80 or a plurality of side covering panels 80, a dado panel 82 or a plurality of dado panels 82 and/or a PSU channel element 84 or a plurality of PSU channel elements 84. If the aircraft system component carrier system 54, as shown in FIG. 5, is connected to two side area modules 76 to form a super module, it is also possible already to connect air-conducting lines of the aircraft air-conditioning system, which are present in the area of the luggage compartments 78 and/or the PSU channel elements 84, to pipelines which are to be mounted in the crown area 18 of the aircraft cabin 20 and constitute a first aircraft system component 36. For this purpose, corresponding connecting lines 86 can be installed.

As emerges from the illustration in FIG. 5, substantial preassembly of a large number of aircraft system components can take place outside the aircraft with the aid of the assembly frame 56. Furthermore, these preassembled aircraft system components and their interfaces can undergo functional testing already outside the aircraft. After the mounting of the super module in an aircraft fuselage element, all that is then required is to check the interfaces of the super module to a further super module.

Figure 6A:
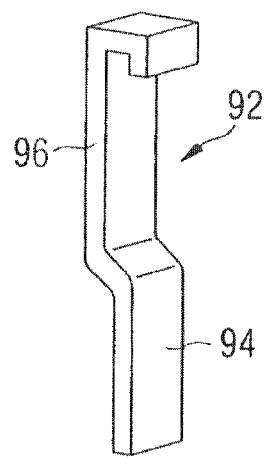
FIGS. 6a and 6b show a system for attaching an aircraft luggage compartment to an aircraft system component carrier module.
Figure 6B:
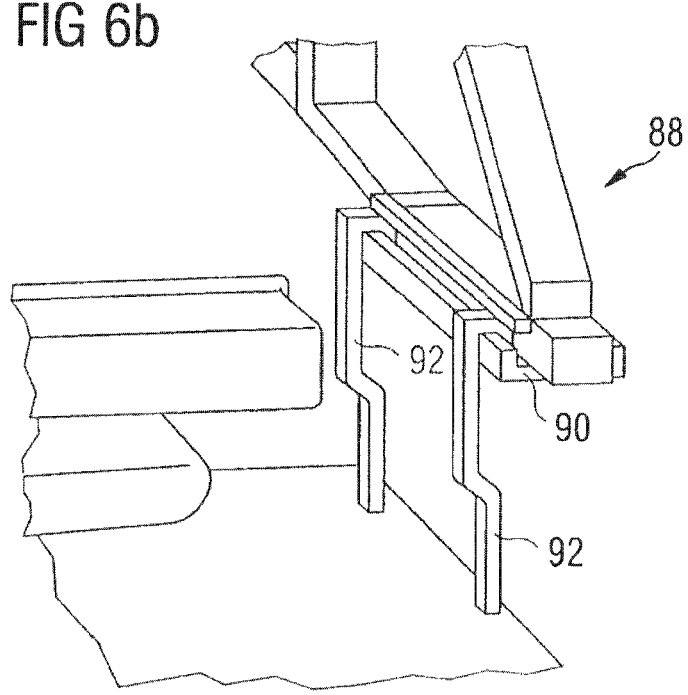
Figure 7:
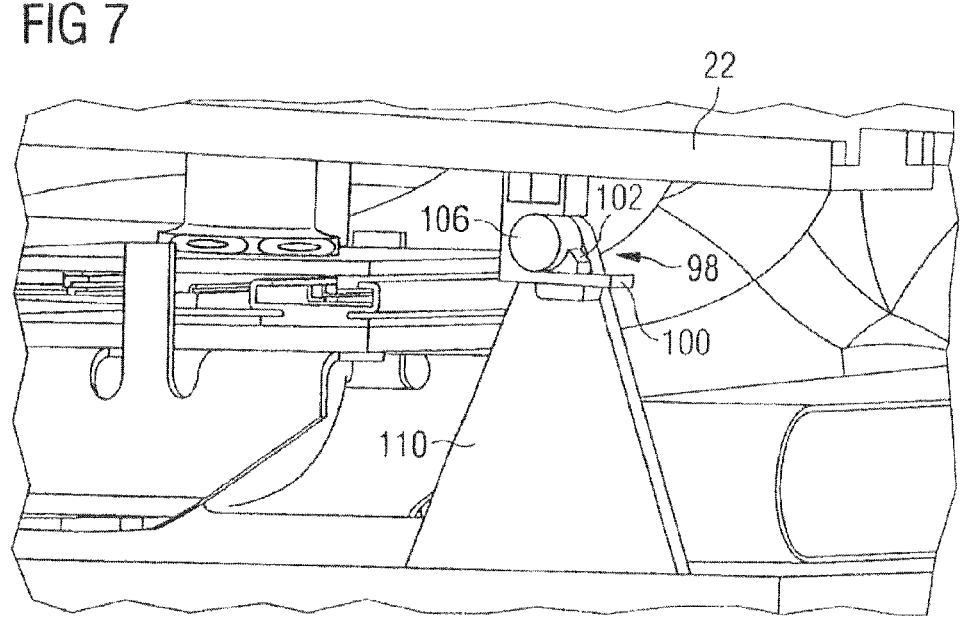
FIGS. 7 and 8 show a further system for attaching an aircraft luggage compartment to an aircraft system component carrier module.
Figure 8:
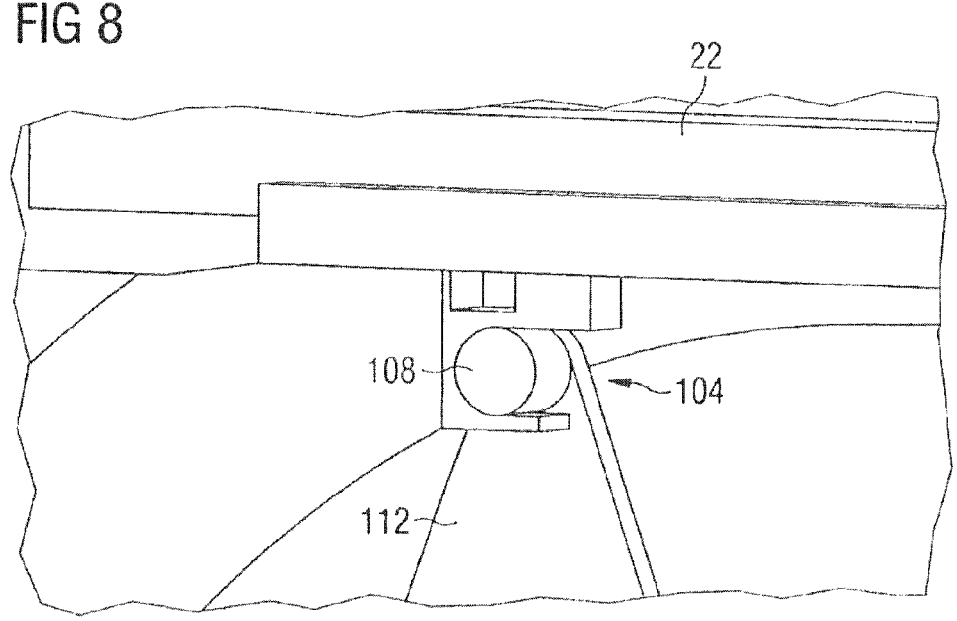

The connection between the aircraft system component carrier modules 10 of the aircraft system component carrier system 54 and the side area modules 76 takes place via the luggage compartments 78 of the side area modules 76. For this purpose, attaching systems illustrated in FIGS. 6 to 8 and 9a to 9c can be employed. In a first embodiment illustrated in FIGS. 6a and 6b, an attaching system for attaching a side area module 76 to an aircraft system component carrier module 10 of the aircraft system component carrier system 54 comprises an attaching device 88 which is assigned to the aircraft system component carrier module 10 and has an attaching rail 90 fitted on the transverse carrier element 22 of the aircraft system component carrier module 10. The attaching rail 90 has an L-shaped cross-section (see FIG. 6b) and is provided for cooperation with two hook elements 92 fitted on an aircraft luggage compartment 78. As shown in FIG. 6a, each hook element 92 has an attaching section 94 provided for connection to the luggage compartment 78 and a hook section 96 provided for cooperation with the attaching rail 90. When the hook is elements 92, as shown in FIG. 6b, are hooked in the attaching rail 90 of the attaching device 88, the hook elements 92 can be secured in their position in the attaching rail 90 by screwing or riveting or by inserting suitable securing elements into the attaching rail 90.

Alternatively to this, an attaching device 88 can be designed as illustrated in FIGS. 7, 8 and 9a to 9c. The attaching device 88 then comprises a first holder 98 which is fastened to the transverse carrier element 22 of the aircraft system component carrier module 10 and has a substantially U-shaped cross-section with an elongated leg 100 (see FIG. 7). The first holder 98 is further provided with a locking mechanism 102 designed in the form of a catch mechanism. The attaching device 88 further comprises a second holder 104 which likewise has a substantially U-shaped cross-section, but is provided neither with an elongated leg nor with a locking mechanism (see FIG. 8).

Figure 9A:
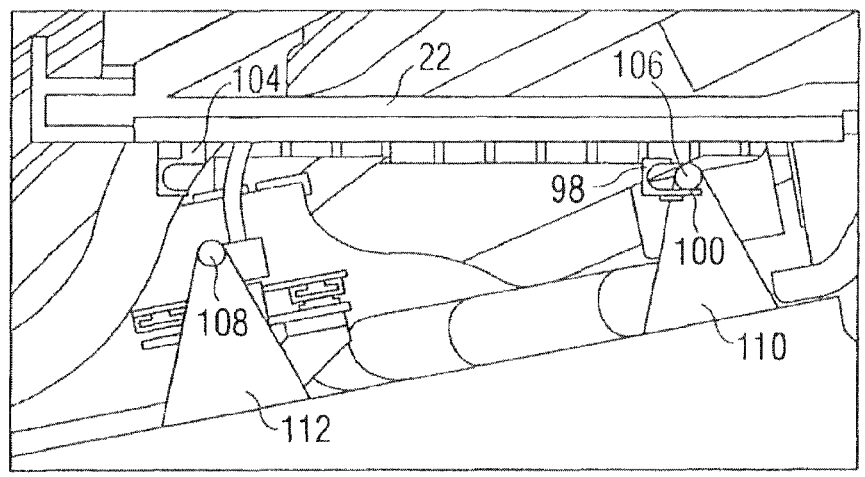
FIGS. 9a to 9c show the connection of an aircraft luggage compartment to an aircraft system component carrier module.
Figure 9B:
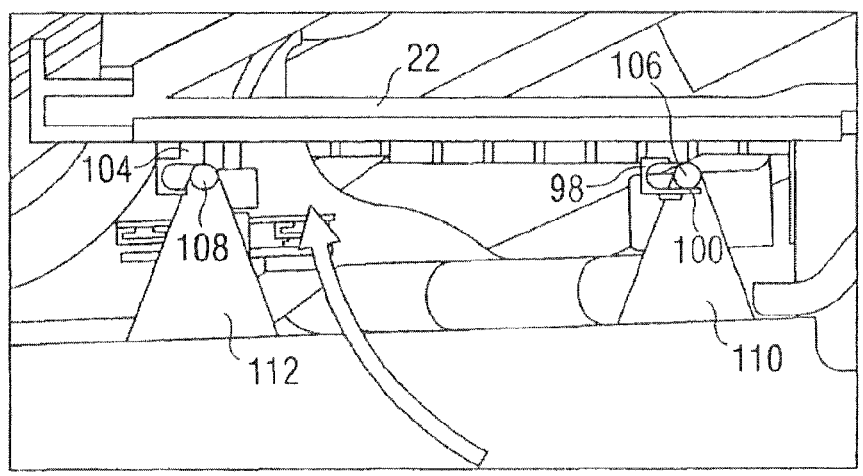
Figure 9C:
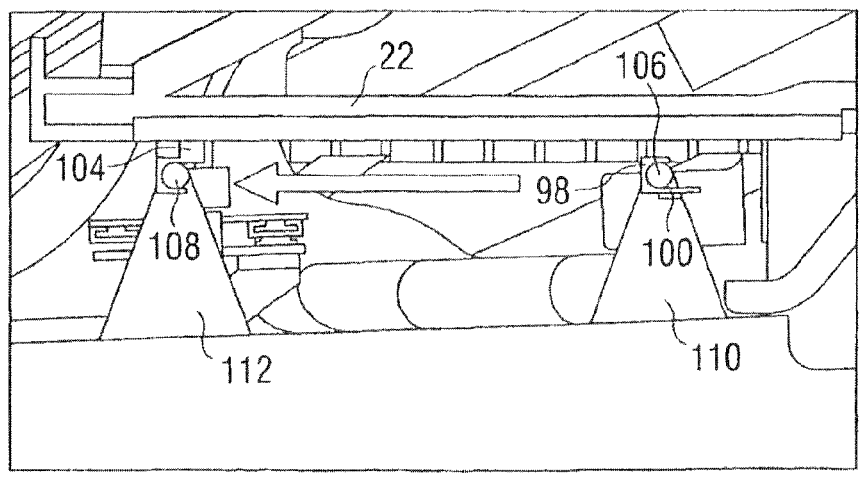

As can best be seen in FIGS. 9a to 9c, the second holder 104 is mounted on the transverse carrier element 22 in an area of the transverse carrier element 22 which, in the state of the aircraft system component carrier module 10 when mounted in an aircraft, is adjacent to a side wall 24, 24' of the aircraft cabin 20. The first holder 98, in contrast, is fastened to the transverse carrier element 22 in an area of the transverse carrier element 22 further away from the side wall 24, 24' of the aircraft cabin 20. Each holder 98, 104 is provided for cooperation with a pin element 106, 108 which is connected to the luggage compartment 78 via a corresponding fastening element 110, 112.

In order to connect the side area module 76 to an aircraft system component carrier module 10 of the aircraft system component carrier system 54, the side area module 76 is firstly brought in a first step (see FIG. 9a) into a position in which the pin element 106 fastened to the luggage compartment 78 rests on the elongated leg 100 of the first holder 98. Subsequently, the side area module 76 is pivoted in such a way that the pin element 108 fastened to the luggage compartment 78 is situated in front of the second holder 104, that is to say in a position ready for reception in the second holder 104 (see FIG. 9b). Finally, the side area module 76 is displaced such that both pin elements 106, 108 fastened to the luggage compartment 78 are securely received in the holders 78, 104 (see FIG. 9c). Finally, the locking mechanism 102 designed in the form of a catch mechanism locks the pin element 106 in its position in the first holder 98 and thereby secures the luggage compartment 78 and consequently the entire side area module 76 to the aircraft system component carrier module 10.

Figure 10:
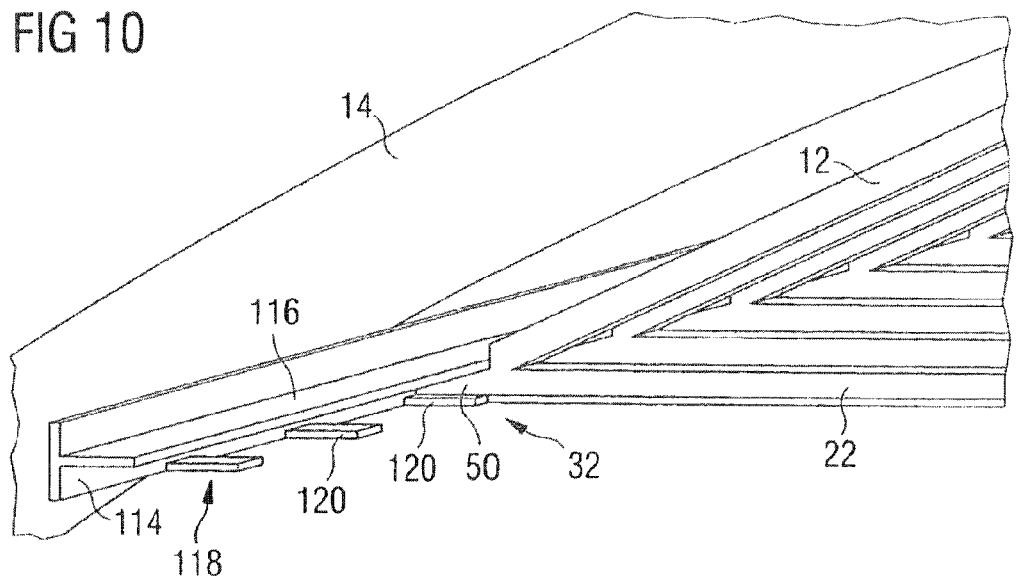
FIGS. 10 and 11 show detail illustrations of a structure holder and a receiving device for connecting an aircraft system component carrier module to an aircraft structure.
Figure 11:
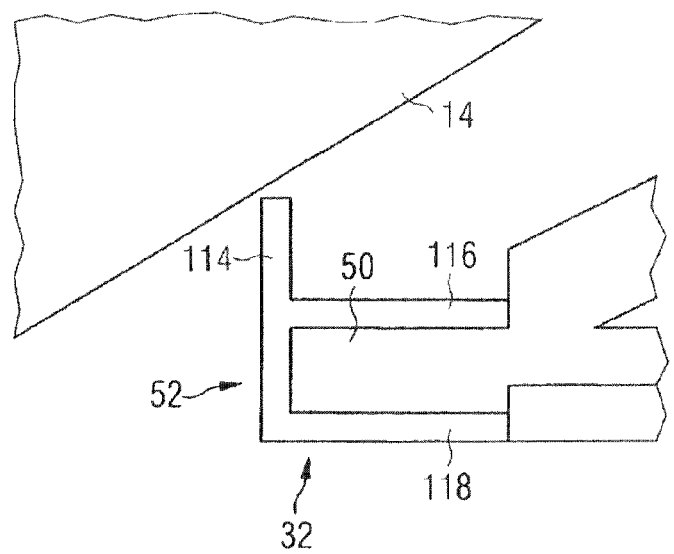

FIGS. 10 to 12, finally, illustrate the mounting of the aircraft system component carrier system 54 in an aircraft fuselage element. For greater clarity, FIG. 12 shows merely the aircraft system component carrier system 54 mounted on the assembly frame 56. However, the assembly frame 56 can, of course, be used not only to mount the aircraft system component carrier system 54, but also a super module comprising additionally two side area modules 76, in an aircraft fuselage element.

For the final mounting of the aircraft system component carrier system 54 in an aircraft fuselage element, firstly the assembly frame 56 with the aircraft system component carrier system 54 mounted thereon is pushed to the final-mounting position of the aircraft system component carrier system 54 in the aircraft fuselage element. Subsequently, the aircraft system component carrier system 54 is connected to the aircraft structure 16, whereupon the assembly frame 56 can be removed from the aircraft fuselage element.

To fasten the aircraft system component carrier system 54 to the aircraft structure 16, the structure holders 32 of the aircraft system component carrier modules 10 of the aircraft system component carrier system 54 cooperate with a receiving device 52 fastened to the ribs 14 of the aircraft structure 16. The receiving device 52 comprises a mounting section 114 which forms part of the primary structure of the aircraft and is fastened to the ribs 14 via the receiving device 52. For this purpose, suitable fastening means, such as for example screws or rivets, can be employed. Extending from the mounting section 114 is a continuous first web 116, the first web 116 being oriented substantially perpendicularly to the mounting section 114. Finally, the receiving device 52 is equipped with a second web 118 designed in the form of an interrupted web. The interrupted web second 118 defines a large number of supporting surfaces 120. The distance between mutually adjacent supporting surfaces 120 is adapted to the distance between two mutually adjacent aircraft system component carrier modules 10 of the aircraft system component carrier system 54. As a result, each aircraft system component carrier module 10 of the aircraft system component carrier system 54 can be connected to the receiving device 52 via a corresponding structure holder 32. In particular, as illustrated in FIG. 11, the projection 50 of the structure holder 32 is received between the first web 116 and a supporting surface 120 of the second web 118. If desired or required, the projection 50 can be secured in its position between the first web 116 and a supporting surface 120 of the second web 118 by means of suitable fastening means, such as for example screws or rivets.

The invention claimed is:

1. An aircraft system component carrier module having:
   a carrier element which is arc-shaped at least in some sections and is configured, when the aircraft system component carrier module is mounted in an aircraft, to extend at least in some sections substantially in a direction of ribs of an aircraft structure over at least a section of a crown area of an aircraft cabin, wherein the carrier element extends, when the aircraft system component carrier module is mounted in the aircraft, substantially parallel to the ribs of the aircraft structure, wherein a curvature of the carrier element is adapted to a curvature of the ribs of the aircraft structure,
   a transverse carrier element which is configured, when the aircraft system component carrier module is mounted in an aircraft, to extend in the crown area of the aircraft cabin substantially perpendicularly to a longitudinal axis of the aircraft cabin, and, at least in some sections, substantially parallel to a transverse axis of the aircraft cabin,
   a structure holder configured to fasten the aircraft system component carrier module to the aircraft structure,
   an aircraft system component holder configured to fasten at least one aircraft system component to the aircraft system component carrier module and
   an attaching device, connected to the transverse carrier element, configured to attach an aircraft luggage compartment to the aircraft system component carrier module,
   wherein the transverse carrier element comprises a first section connected to the carrier element and a second section connected to at least one of the first section and to a connecting element, the second section of the transverse carrier element being connected pivotally to at least one of the first section of the transverse carrier element, to a third section of the transverse carrier element and to the connecting element.

2. The aircraft system component carrier module according to claim 1,
   wherein the attaching device comprises an attaching rail fitted on the transverse carrier element and having an L-shaped cross-section, which rail is provided for cooperation with a hook element fitted on an aircraft luggage compartment, and/or wherein the attaching device comprises a holder fitted on the transverse carrier element and having a substantially U-shaped cross-section, which holder is provided for cooperation with a pin element fitted on an aircraft luggage compartment.

3. The aircraft system component carrier module according to claim 2,
   wherein the holder of the attaching device is provided with a locking mechanism configured to lock the pin element, fitted on an aircraft luggage compartment, in its position in the holder.

4. An aircraft system component carrier system having:
   plurality of aircraft system component carrier modules according to claim 1, which, when the aircraft system component carrier system is mounted in an aircraft, are arranged one behind the other in the direction of a longitudinal axis of an aircraft cabin.

5. The aircraft system component carrier system according to claim 4,
   further comprising an aircraft system component which is configured in the form of a pipeline or a fastening rail and is fastened to a plurality of the aircraft system component carrier modules by corresponding aircraft system component holders of the aircraft system component carrier modules, the aircraft system component configured in the form of the fastening rail having, in particular, an Ω-shaped cross-section.

6. The aircraft system component carrier module according to claim 1,
   further comprising a connecting element which is connected to at least one of the carrier, element and the transverse carrier element.

7. The aircraft system component carrier module according to claim 1,
   wherein the attaching device comprises a first holder fitted on the transverse carrier element and having a substantially U-shaped cross-section and a second holder fitted on the transverse carrier element and having a substantially U-shaped cross-section, the first and the second holder each being structured to cooperate with a pin element fitted on an aircraft luggage compartment, and the first holder comprising an elongated leg which is configured to support temporarily, on the attachment of the aircraft luggage compartment to the aircraft system component carrier module, a pin element fitted on the aircraft luggage compartment and structured to cooperate with the first holder.

8. The aircraft system component carrier module according to claim 1,
   wherein the structure holder comprises a projection which is connected to at least one of the carrier element and the transverse carrier element and which, when the aircraft system component carrier module is mounted in an aircraft, extends substantially perpendicularly to the longitudinal axis and substantially parallel to a transverse axis of the aircraft cabin and is structured to be received in a receiving device which is fastenable to the aircraft structure.

9. An aircraft system component carrier system having:
   a plurality of aircraft system component carrier modules each comprising a carrier element which is arc-shaped at least in some sections and is configured, when the aircraft system component carrier module is mounted in an aircraft, to extend at least in some sections substantially in a direction of ribs of an aircraft structure over at least a section of a crown area of an aircraft cabin, wherein the carrier element extends, when the aircraft system component carrier module is mounted in the aircraft, substantially parallel to the ribs of the aircraft structure, wherein a curvature of the carrier element is adapted to a curvature of the ribs of the aircraft structure, a transverse carrier element which is configured, when the aircraft system component carrier module is mounted in an aircraft, to extend in the crown area of the aircraft cabin substantially perpendicularly to a longitudinal axis of the aircraft cabin, and, at least in some sections, substantially parallel to a transverse axis of the aircraft cabin, a structure holder configured to fasten the aircraft system component carrier module to the aircraft structure, an aircraft system component holder configured to fasten at least one aircraft system component to the aircraft system component carrier module and an attaching device, connected to the transverse carrier element, configured to attach an aircraft luggage compartment to the aircraft system component carrier module, which, when the aircraft system component carrier system is mounted in an aircraft, are arranged one behind the other in the direction of a longitudinal axis of an aircraft cabin, the carrier system further comprising a receiving device, which is fastenable to the aircraft structure, for cooperation with the structure holders provided on the aircraft system component carrier modules, the receiving device comprising a first web and a second web extending substantially parallel to the first web, and the distance of the webs of the receiving device from one another being such that a projection provided on the structure holders of the aircraft system component carrier modules are positionable between the webs of the receiving device, the first web of the receiving device being, in particular, a continuous web and the second web of the receiving device being, in particular, an interrupted web.

* * * * *